United States Patent
Katsumata et al.

(10) Patent No.: US 6,495,982 B2
(45) Date of Patent: Dec. 17, 2002

(54) ELECTRIC MOTOR CONTROL

(75) Inventors: Hiromi Katsumata, Gotenba (JP); Toshihiko Watanabe, Gotenba (JP)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/881,396

(22) Filed: Jun. 14, 2001

(65) Prior Publication Data

US 2001/0054873 A1 Dec. 27, 2001

(30) Foreign Application Priority Data

Jun. 23, 2000 (JP) ........................................ 2000-188876

(51) Int. Cl.$^7$ ................................................ H02H 7/08
(52) U.S. Cl. ........................ 318/471; 318/445; 318/472; 318/473; 318/729; 318/786; 361/24; 361/26; 361/104; 361/105
(58) Field of Search ................................ 318/445, 471, 318/472, 473, 786, 729; 361/24, 26, 104, 105

(56) References Cited

U.S. PATENT DOCUMENTS

| 3,636,426 A | * | 1/1972 | Buiting ..................... 318/471 |
| 3,874,187 A | * | 4/1975 | Anderson .................... 62/230 |
| 3,963,962 A | * | 6/1976 | Sutton ....................... 317/13 |
| 4,207,602 A | * | 6/1980 | Kussy et al. ................. 361/24 |
| 4,494,162 A | * | 1/1985 | Eyler ......................... 361/29 |
| 4,547,825 A | * | 10/1985 | Vind ......................... 361/22 |
| 4,689,533 A | * | 8/1987 | Yang ........................ 318/281 |
| 4,843,295 A | * | 6/1989 | Thompson et al. .......... 318/786 |
| 4,979,069 A | * | 12/1990 | Simpson ...................... 361/31 |
| 5,053,908 A | | 10/1991 | Cooper et al. |
| 5,170,307 A | | 12/1992 | Nacewicz et al. |
| 5,212,436 A | | 5/1993 | Nacewicz et al. |
| 5,561,357 A | * | 10/1996 | Schroeder .................... 318/789 |
| 5,729,416 A | | 3/1998 | Renkes et al. |
| 5,898,555 A | * | 4/1999 | Katsumata et al. ............ 361/26 |
| 5,995,351 A | * | 11/1999 | Katsumata et al. .......... 361/105 |
| 6,097,275 A | | 8/2000 | Kudoh |

FOREIGN PATENT DOCUMENTS

| JP | 9-213182 | * | 8/1997 | .......... H01H/37/54 |
| JP | 10-308150 | * | 11/1998 | .......... H01H/37/54 |
| WO | WO 98/21735 | | 5/1998 | |

* cited by examiner

Primary Examiner—Marlon T. Fletcher
Assistant Examiner—Tyrone Smith
(74) Attorney, Agent, or Firm—Russell E. Baumann; Frederick J. Telecky, Jr.

(57) ABSTRACT

A start-up switch 50 for an electric motor 1 comprises a resistive element (54) which is so constituted as to be connectable to an electric current path (15) and which has such a characteristic that its resistance value increases by the heat generated by electric current that flows through the electric current path (15) and a thermostatic switch (60) which is connected in series with the resistive element (54). The thermostatic switch (60) has an actuation member (60) which is responsive to temperature so that upon reaching a preselected temperature, said member moves from a closed current path position to an open current path position. The thermostatic switch (60) is positioned to be in direct heat transfer relationship with the resistive element (54) so that the member will (66) rise in temperature as the resistive element (54) rises in temperature.

6 Claims, 4 Drawing Sheets

ELECTRIC MOTOR CONTROL

FIELD OF THE INVENTION

This invention relates to an electrical motor control for an electric motor and more particularly a start-up switch and a protector which is associated with the start-up switch to be installed on the compressor unit for use in a refrigerator, etc.

BACKGROUND OF THE INVENTION

In the case of a compressor to be used in the refrigerator or the like, it is usually the case that there is provided a start-up switch for supplying start-up torque to the rotor in a single phase motor during the start-up of the motor. This start-up switch is typically constructed in such a way to include a resistive element that has a characteristic of increasing its resistance value with the elevation of its temperature. This switch is connected in series with the auxiliary winding that is connected in parallel with the main winding of the motor.

Such a start-up switch according to prior art is designed to give start-up torque to the rotor of the motor due to the flow of a prescribed electric current to the auxiliary winding at the time the temperature of the resistive element is low and accordingly its resistance value is also low. After the start-up of the motor, however, the resistive element starts to generate heat due to the electric current that flows through the auxiliary winding, which results in an increase in its resistance value. As a result, the electric current that flows to the auxiliary winding gradually decreases, with a result that a constant electric current starts flowing to the main winding.

In the case of such a prior art start-up switch, however, the electric current continues to flow, albeit at a low level, to the auxiliary winding of the motor, with the result that electrical power is unnecessarily wasted in the auxiliary winding subsequent to the start-up of the motor.

SUMMARY OF THE INVENTION

It is an object of the present invention to provide a simple, reliable, compact and economical device, which is capable of reducing the electric power consumed by a motor.

Briefly, an electrical motor control for an electric motor made in accordance with this invention, comprises a start-up switch electrically connected in series with the auxiliary winding which includes a resistive element having a characteristic that its resistive value increases with an increase in temperature and a thermostatic switch having a bimetallic actuation member which is responsive to temperature so that upon reaching a preselected thermostatic switch actuation temperature said member moves from a closed current path position to an open current path position, which removes electric power from said auxiliary winding, said thermostatic switch being positioned to be in direct heat transfer relationship with said resistive element so that said actuation member will raise in temperature as said resistive element raises in temperature to a temperature above said preselected thermostatic switch actuation temperature.

In another aspect of the invention, the thermostatic switch remains in the open current path position even after the resistive element of the start-up switch has cooled down. This object is obtained by positioning the thermostatic switch in direct heat transfer relationship with the motor and providing the preselected thermostatic switch actuation temperature to be less than the operational temperature of the motor after start-up.

In yet another aspect of the invention, both the start-up switch and motor protector are contained in the same package which is mounted on the three terminal pins of the motor for a compact, efficient design.

BRIEF DESCRIPTION OF THE DRAWINGS

The accompanying drawings, which are incorporated in and constitute a part of the specification, illustrate preferred embodiments of the invention and, together with the description, serve to explain the objects, advantages and principles of the invention. In the drawings.

DETAILED DESCRIPTION OF THE PREFERRED EMBODIMENTS

Figure 1:
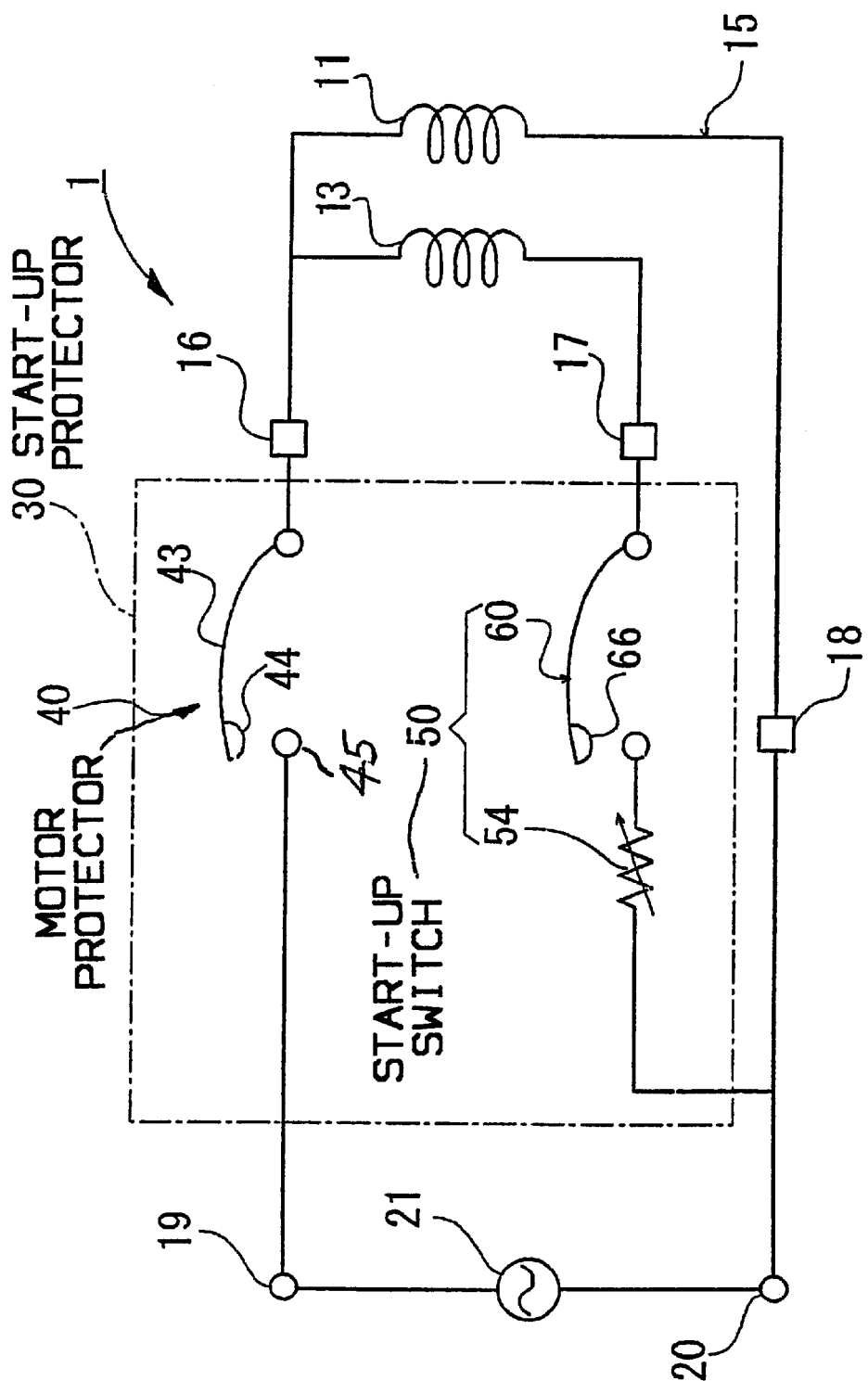
FIG. 1 shows a schematic diagram of circuitry showing essential parts of a motor and a start-up protector in accordance with a first embodiment of this invention.

As is shown in FIG. 1, an electric motor 1 is provided which comprises a main winding 11 and an auxiliary winding 13 and a start-up protector 30 in its driving circuit 15. Main winding 11 and auxiliary winding 13 are wound on a prescribed rotor (which is not shown in the drawing) and they are electrically connected in parallel.

In accordance with the invention, start-up protector 30 comprises a motor protector 40 and a start-up switch 50 with motor protector 40 being electrically connected with main winding 11 through a first connective terminal pin 16 of the motor on the side of main winding 11. A start-up switch 50 is electrically connected to the auxiliary winding 13 through a second connective terminal pin 17 of the motor on the side of auxiliary winding 13. Start-up switch 50 is further electrically connected, in parallel, to main winding 11 through a third connective terminal pin 18 of the motor on the side of main winding 11.

There is provided a driving circuit 15, which is connected to an alternating current power source 21 through terminals 19 and 20 for supplying power to the motor.

Figure 2:
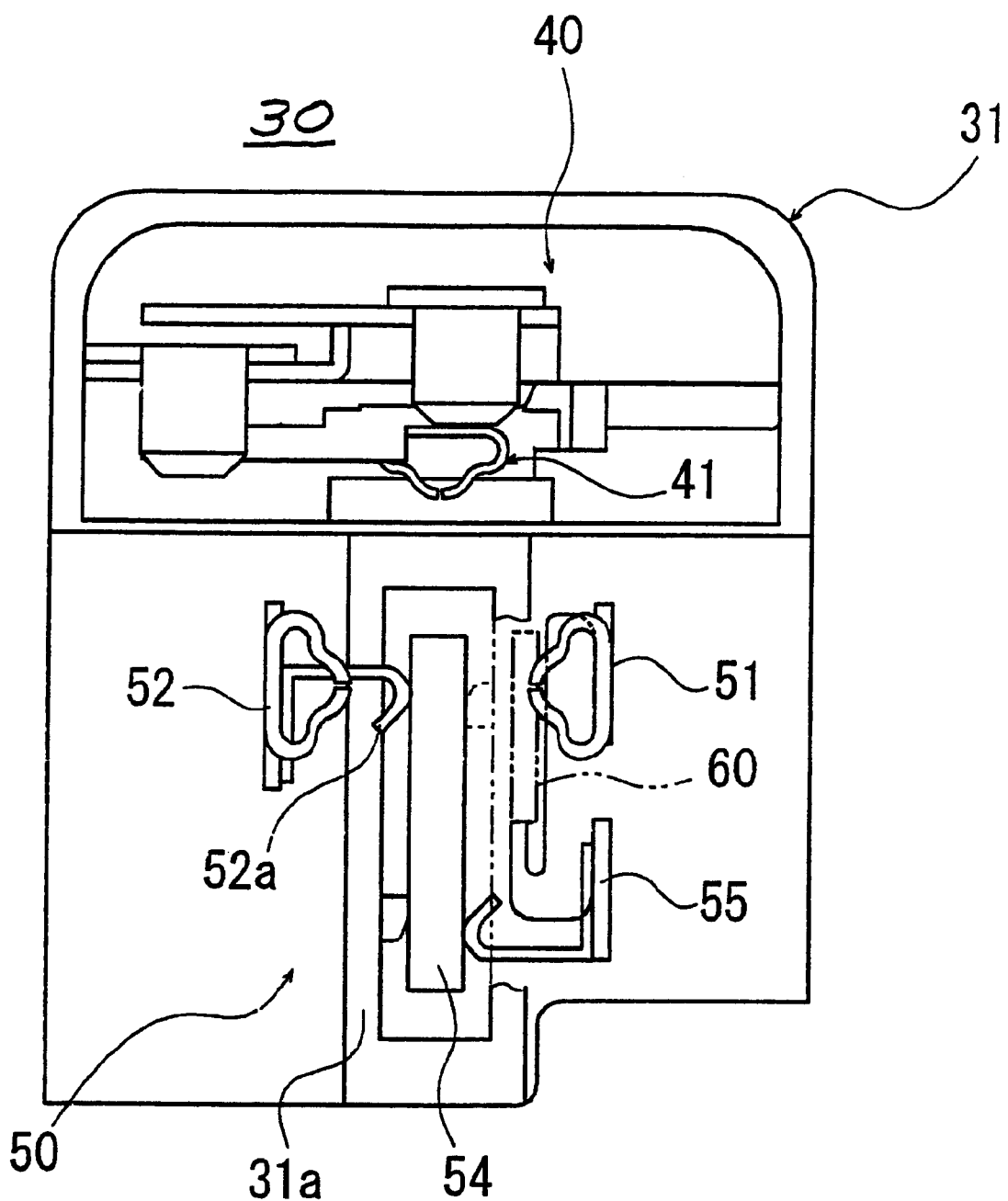
FIG. 2 shows a general construction of the start-up protector of FIG. 1.

As is shown in FIG. 2, start-up protector 30 has a casing 31 which can be mounted on said motor main casing on terminal pins 16, 17 and 18.

Inside of this casing 31, there is provided a motor protector 40 as is known in the art which has a first connective terminal 41 which is adapted to engage with first connective terminal pin 16. Motor protector 40 has a bimetallic disk switch arm 43 which is electrically connected to connective terminal 41. Disk switch arm 43 has a movable contact member 44 mounted on it and it is positioned to normally be in engagement with a stationary contact member 45. Disk switch arm 43 is constructed so that it will snap over center to an inverted position (open contact position with movable contact not engaging stationary contact 45) at a prescribed temperature. The motor protector 40 protects against overcurrent conditions that flows to main windings 11 and high ambient temperature conditions.

In addition, a start-up switch 50 is provided in the casing 31 of the start-up protector 30. This start-up switch 50 has a thermostatic switch 60 and a variable resistive element 54 and further possesses second and third connective terminals 51 and 52 that are adapted respectively to make engagement with the second and third connective terminal pins 17 and 18 of the main electric motor 10. As is shown in FIG. 1, thermostatic switch 60 is connected in series to the second connective terminal 52. Additionally, resistive element 54 is connected in series to the thermostatic switch 60.

In accordance with this invention, resistive element 54 is a variable resistive element preferably having a positive temperature coefficient (PTC). That is, it has such a characteristic that its resistance value rises along with the elevation of the temperature of the element.

Such a resistive element 54 is accommodated in a cavity 31a which is provided approximately at the center of the casing 31. Around cavity 31a, said second and third connective terminals 51 and 52 are arranged in such a manner as to face each other and a spring terminal 55 is further arranged on the side of the second connective terminal 51. The resistive element 54 is contacted on one side by a spring terminal part 52a that has been formed on the third connective terminal 52 and on the other side by a spring terminal 55.

Thermostatic switch 60 is arranged between second connective terminal 51 and the resistive element 54 to be touching or in close proximity to both of them so as to be directly affected by the temperature of them.

Figure 3:
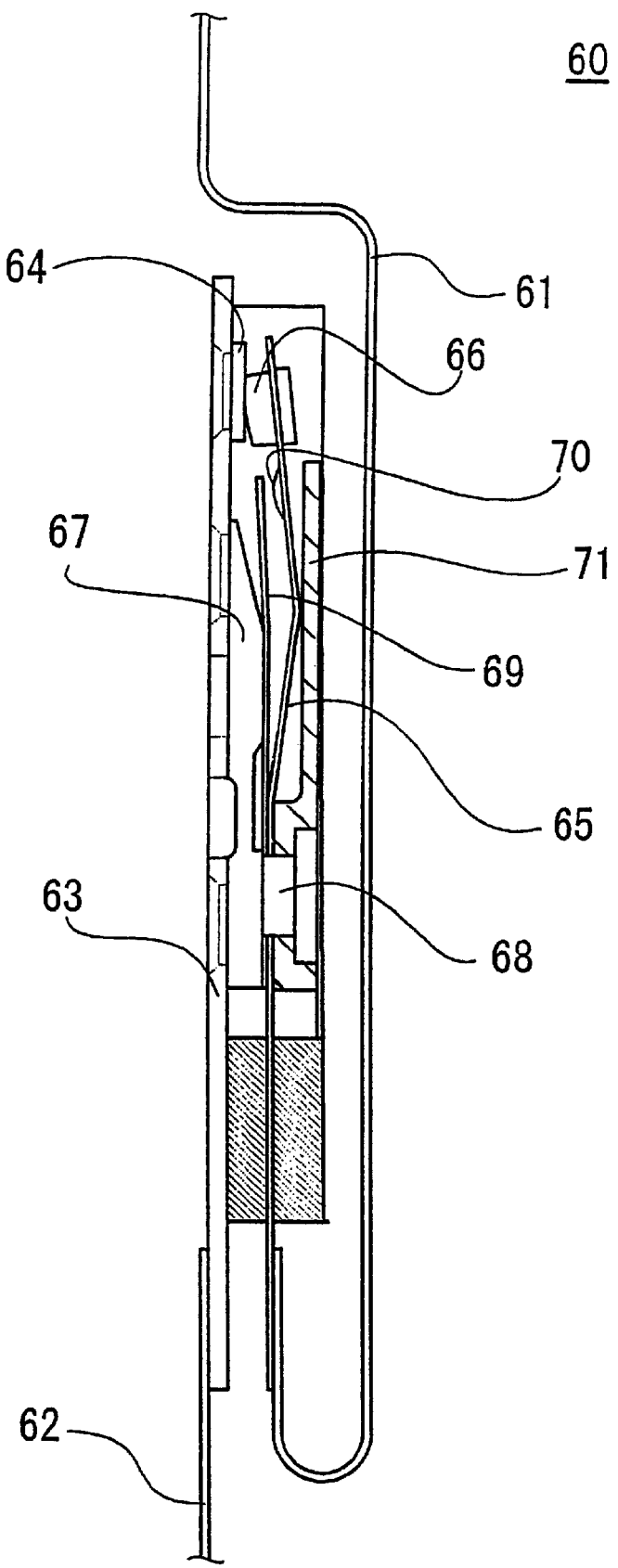
FIG. 3 shows a general construction of a thermostatic switch in accordance with this invention.

FIG. 3 shows a general construction of a thermostatic switch according to this embodiment. As is shown in FIG. 3, the thermostatic switch 60 comprises a first lead terminal 61 that is connected to the second connective terminal 51 and a second lead terminal 62 that is connected to the spring terminal 55. A base plate 63 is attached to second lead terminal 62 and has a fixed contact 64 mounted on it.

An arm plate 65 has a movable contact 66 mounted on it and is connected to first lead terminal 61. This arm plate 65 is supported on a supporting axis 68 that has been provided through an insulator 67, and is so arranged that the movable contact 66 is adapted to contact the fixed contact 64 of the base plate 63.

A disc plate 69 which is made of a bimetallic material is arranged between the arm plate 65 and the base plate 63. This disc plate 69 is arranged on the insulator 67 in the state of being supported on the supporting axis 68. Moreover, the tip part of disc plate 69 is arranged at a prescribed distance from a raised portion 70 that is provide in the neighborhood of the movable contact 66 of the arm plate 65.

Disc plate 69 is constructed of a prescribed shape and material combination so as to actuate at prescribed temperatures to cause the separation of movable contact 66 from fixed contact 64 thereby cutting off the electric current that flows through the auxiliary winding 13. That is, at a prescribed temperature, disc plate snaps over center, engaging portion 70 of arm plate 65 which causes arm plate 65 and specifically movable contact 66 to break engagement with stationary contact 64 thereby cutting off the electric current that flows through the auxiliary winding 13.

In accordance with this invention, the temperature at which disc plate 69 operates/moves arm plate 65 (the working temperature of the thermostatic switch 60) is set lower than the "driving" temperature of the electric motor 1. Typically, driving temperature is approximately 80 degrees centigrade whereas the working temperature is approximately 60 degrees centigrade. It is mentioned here that this working temperature is set higher than the typical temperature at the time of the start-up of the electric motor at the normal temperature.

A sub-plate 71 is provided on the opposing side of the base plate 63. This sub-plate 71 is arranged in such a way as to hold the arm plate 65 and the disc plate 69 between the base plate 63 and itself. Preferably, the material for the base plate 63 and the sub-plate 71 is a material whose thermal conductivity is high such as a copper alloy material so as to maintain the temperature in the space between the base plate 63 and the sub-plate 71, generally the same as the temperature of base plate 63 and sub-plate 71.

In the above described embodiment, the electric motor 1 is started up in the state where the start-up protector 30 has the electrical contacts of both the motor protector 40 and thermostatic switch 60 in the closed position. The resistance value of the resistive element 54 is low as the temperature of the resistive element 54 of the start-up switch 50 is at approximately ambient temperature. As a result of this, a prescribed electric current is caused to flow to the auxiliary winding 13 through the resistive element 54. As the electric current continues to flow to the resistive element 54 thereafter, the resistive element 54 is heated and reaches a preselected high temperature (such as about 200 degrees centigrade, for instance). As a consequence of this, the resistance value of the resistive element 54 increases, thereby making it harder for the electric current to flow to the resistive element 54 and accordingly allowing only a small amount of electric current to flow to the auxiliary winding 13 through this resistive element 54.

Thermostatic switch 60 is arranged, however, in the vicinity of the resistive element 54 in direct heat transfer relationship. As a result, disc plate 69 is heated and upon achieving a temperature above the preselected working temperature, the disc plate 69 snaps over center and the arm plate 65 jumps upward, with a result that the electric current in the start-up switch 50 is cut off. Accordingly, electric current no longer follows to the auxiliary winding at all.

When the supply of the electric current is continued thereafter, the current will not flow to the resistive element 54, and the temperature of the resistive element 54 gradually comes down. However, due to the fact that the thermostatic switch 60 is close to the second connective terminal 51, the heat from the electric motor 1 (the side of the main winding 11) is transmitted to the disc plate 69 through the second connective terminal pin 17. Additionally, base plate 63 and sub-plate 71 also supply heat to disc plate 69. This heat helps keep disc plate 69 at a temperature which is higher than the reset temperature for the disc plate so that arm plate 65 maintains the state in which its movable contact 66 is separated from the fixed contact of base plate 63. As a result of this, the start-up switch 50 continues maintaining the state in which no electric current is caused to flow to the auxiliary winding 13 during the operation of the electric motor 1.

After shutting off the power to electric motor 1, the electric motor 1 and the resistive element 54 of the start-up switch 50 will cool back to the normal temperature, with a result that the disc plate 69 of the start-up switch 50 returns to closed contact state. That is, arm plate 65 resets causing movable contact 66 to contact the fixed contact 64. If the electric motor 1 is started up once again, the series of actions described above are repeated.

Meanwhile, if during the operation of the motor there are excess current flows to the main winding 11, the motor protector 40 will actuate to cut off the electric current that flows through the main winding 11 by the disc switch 43 snapping over center to an open contact position. At this time no current is supplied to the motor.

Figure 4:
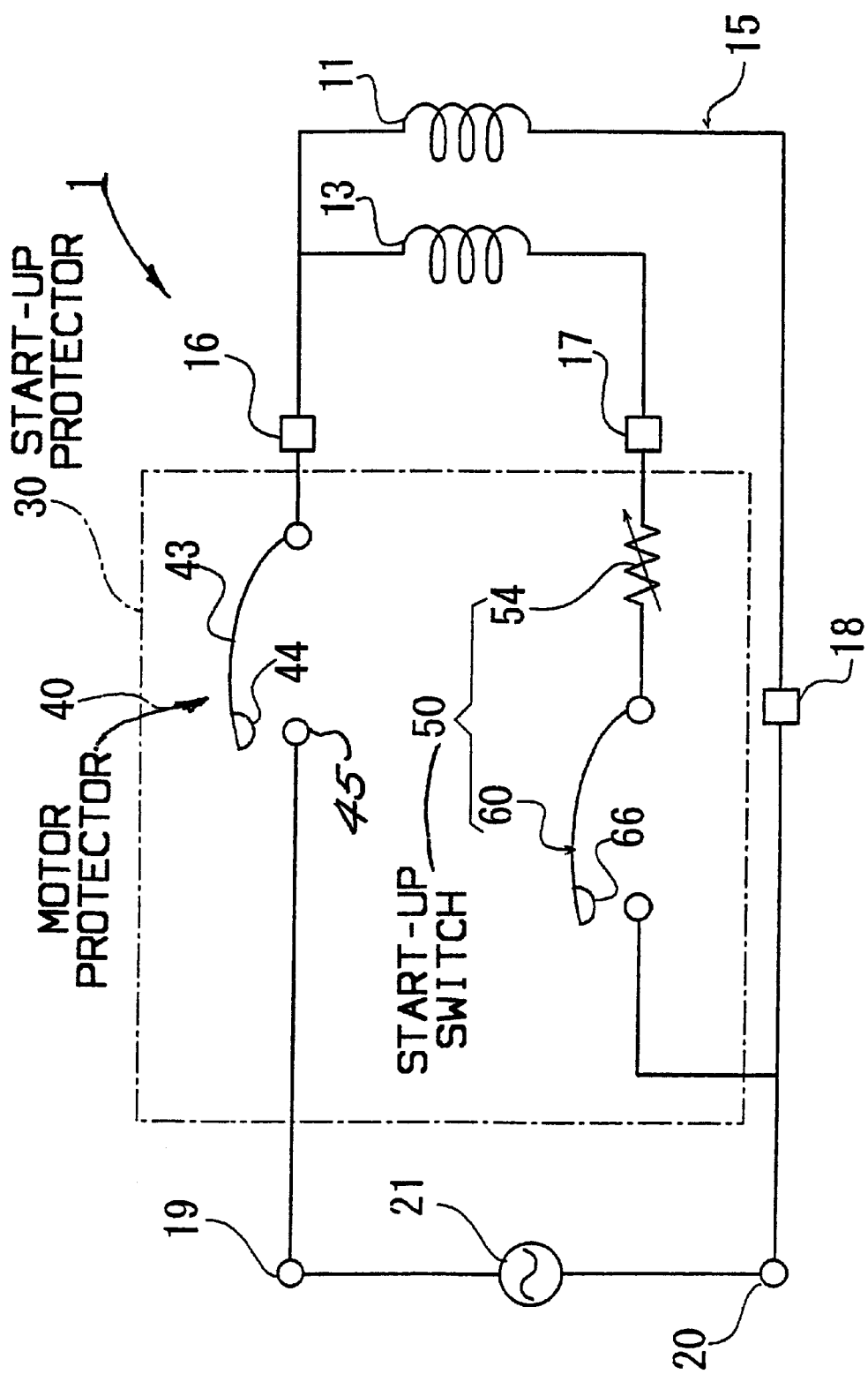
FIG. 4 shows a schematic diagram of circuitry showing essential parts of a motor and start-up protector in accordance with a second embodiment of this invention.

FIG. 4 indicates the circuitry showing the essential parts of the electric motor according to a second embodiment of this invention. The same codes will be used to denote those parts corresponding to the earlier described embodiment and a detailed explanation of them will not be repeated.

In this embodiment, only the order of the connections of the thermostatic switch 60 in the start-up switch 50 and the resistive element 54 is different from the form of the aforementioned embodiment. In this embodiment, they are switched in position against the auxiliary winding 13 of the main electric motor 1.

Still, however, the thermostatic switch 60 of the start-up switch 50 is arranged in the neighborhood of the resistive element 54 and the third connective terminal 52 so that heat is received efficiently as in the case of the first embodiment. In other structural form and operational performance, the two embodiments function and operate the same.

In accordance with this invention described above, the thermostatic switch 60 has been provided in start-up switch 50 and the electric current is caused not to flow to the auxiliary winding 13 by the heating of it by the resistive element 54. Accordingly, the unnecessary electric power that is consumed by the auxiliary winding 13 can be eliminated and the electric power that is consumed by the electric motor 1 as a whole can be reduced.

In accordance with this invention, moreover, the thermostatic switch 60 of the start-up switch 50 is arranged in the vicinity of the resistive element 54, with the heat of the resistive element 54 being transmitted efficiently to the thermostatic switch 60. It becomes possible to cut off the electric current of the auxiliary winding 13 that decreases along with the heating of the resistive element 54 immediately, thereby facilitating the reduction of the electric power that is consumed, in connection with the start-up of the electric motor 1.

In accordance with this invention, the thermostatic switch 60 of the start-up switch 50 is arranged in the vicinity of the connective terminal 51 and pin 17 (first embodiment) with the main electric body 1, thereby making it possible for the heat of the main electric motor 1 to be transmitted to the thermostatic switch 60. Additionally, the working temperature of the thermostatic switch 60 is set lower than the driving temperature of the main electric motor so that even if the resistive element 54 may be cooled during the operation of the electric motor 1, the state in which no electric current flows to the auxiliary winding 13 can be maintained by heating from the electric motor 1.

In accordance with this invention, moreover, start-up switch 50 and motor protector 40 have been integrated as a start-up protector 30 so as to be mounted in insulative casing 31 on electric motor 1. There is an advantage in that such a mounting arrangement is simple and compact as compared with the case where the elements are mounted separately according to prior art.

In view of the above, it will be seen that the several objects of the invention are achieved and other advantageous results obtained. As various changes could be made in the above construction without departing from the scope of the invention, it is intended that all matter included in the above description or shown in the accompanied drawings be interpreted as illustrative and not in a limiting sense.

What is claimed:

1. An electrical motor control for an electric motor having a main winding and an auxiliary winding electrically connected in parallel in an electric circuit for supplying power to the motor comprising a start-up switch electrically connected in series with said auxiliary winding which includes a resistive element having a characteristic that its resistive value increases with an increase in temperature and a thermostatic switch having a bimetallic actuation member which is responsive to temperature so that upon reaching a preselected thermostatic switch actuation temperature said member moves from a closed current path position to an open current path position, which removes electric power from said auxiliary winding while still allowing electric power to be supplied to the electric motor, said thermostatic switch being positioned to be in direct heat transfer relationship with said resistive element so that said actuation member will rise in temperature to a temperature above said preselected thermostatic switch actuation temperature as said resistive element rises in temperature, said start-up switch is mounted adjacent said motor to thereby provide heat transfer from said motor to said start-up switch to maintain the temperature of the bimetallic actuation member during operation of the motor after start-up above a reset temperature for such member thereby maintaining the switch in the open current path position.

2. An electrical motor control of claim 1 further including a housing that is mounted on said motor and which contains therein said start-up switch and a motor protector device, said motor protector device is electrically connected in series with the main winding of said motor and it includes an actuation device which is responsive to temperature and over-current conditions so that upon reaching a preselected motor protector actuation temperature said protector actuation device moves from a closed current path position to an open current path position to stop the supply of current being delivered to said motor.

3. An electrical motor control of claim 2 wherein said thermostatic switch actuation member and said motor protector actuation device each include a snap action bimetallic member.

4. An electrical motor control of claim 3 wherein said thermostatic switch bimetallic actuation member has a reset temperature below the ambient operational temperature of the motor.

5. An electrical motor control for an electric motor having three terminal connector pins associated therewith and having a main winding and an auxiliary winding electrically connected in parallel in an electric circuit for supplying power to the motor comprising a housing mounted on said motor, said housing having a first cavity containing a start-up switch electrically connected in series with said auxiliary winding of said motor which includes a resistive element having a characteristic that its resistive value increases with an increase in temperature and a thermostatic switch having an actuation member which is responsive to temperature so that upon reaching a preselected thermostatic switch actuation temperature said member moves from a closed current path position to an open current path position, which removes electric power from said auxiliary winding while still allowing electric power to be supplied to the motor, said thermostatic switch being positioned to be in direct heat transfer relationship with said resistive element so that said actuation member will rise in temperature to a temperature above preselected thermostatic switch actuation temperature as said resistive element rises in temperature, said start-up switch is mounted adjacent said motor in close proximity to one of said terminal pins to thereby provide heat transfer from said motor to said start-up switch to maintain the temperature of the actuation member during operation of the motor after start-up above a reset temperature for such member thereby maintaining the switch in the open current path position, and a second cavity containing a motor protector device, said motor protector device is electrically connected in series with the main winding of said motor, and it includes an actuation device which is responsive to temperature and over-current conditions so that upon reaching a preselected motor protector actuation temperature said protector actuation device moves from a closed current path position to an open current path position to stop the supply of current being delivered to the motor.

6. An electrical motor control of claim 5 wherein said thermostatic switch actuation member and said motor protector actuation device each include a snap action bimetallic member.

* * * * *